US012317148B2

(12) United States Patent
Ozturk et al.

(10) Patent No.: US 12,317,148 B2
(45) Date of Patent: *May 27, 2025

(54) UPLINK SWITCHING FOR ENHANCED MOBILITY

(71) Applicant: QUALCOMM Incorporated, San Diego, CA (US)

(72) Inventors: Ozcan Ozturk, San Diego, CA (US); Karthika Paladugu, San Diego, CA (US); Gavin Bernard Horn, La Jolla, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 17/659,669

(22) Filed: Apr. 19, 2022

(65) Prior Publication Data

US 2022/0295368 A1    Sep. 15, 2022

Related U.S. Application Data

(63) Continuation of application No. 16/946,911, filed on Jul. 10, 2020, now Pat. No. 11,317,331.

(Continued)

(51) Int. Cl.
*H04W 36/18*    (2009.01)
*H04W 36/00*    (2009.01)
*H04W 36/30*    (2009.01)

(52) U.S. Cl.
CPC ....... *H04W 36/18* (2013.01); *H04W 36/0016* (2013.01); *H04W 36/0072* (2013.01); *H04W 36/302* (2023.05)

(58) Field of Classification Search
CPC ............. H04W 36/08; H04W 36/0016; H04W 36/0072; H04W 36/18; H04W 36/30; H04W 36/302; H04W 36/0085
See application file for complete search history.

(56) References Cited

U.S. PATENT DOCUMENTS 8,233,452 B2    7/2012  Makhijani et al.
10,244,444 B2   3/2019  Ozturk et al.
(Continued)

FOREIGN PATENT DOCUMENTS

CN    107889172 A    4/2018
JP    2012520616 A   9/2012
(Continued)

OTHER PUBLICATIONS

Ericsson: "Single vs Dual Active Protocol Stack for Reduced Handover Interruption", R2-1903894, 3GPP TSG-RAN WG2#105bis, Xian, China, Apr. 8-12, 2019, pp. 1-7.

(Continued)

*Primary Examiner* — Chae S Lee
(74) *Attorney, Agent, or Firm* — Harrity & Harrity, LLP\ Qualcomm

(57) ABSTRACT

This disclosure provides systems, methods and apparatuses, including computer programs encoded on computer storage media, for uplink switching for enhanced mobility. In some aspects, this disclosure provides techniques for potentially reducing or eliminating service interruptions experienced during a handover from a source cell to a target cell. Additionally, this disclosure provides techniques for potentially simplifying or improving uplink communications while a UE is connected to both the source cell and the target cell during the handover. This disclosure further provides techniques for potentially reducing UE power consumption or improving uplink resource utilization during a handover from a source cell to a target cell while a UE is connected (Continued)

to both the source cell and the target cell during the handover.

32 Claims, 7 Drawing Sheets

Related U.S. Application Data

(60) Provisional application No. 62/886,221, filed on Aug. 13, 2019.

(56) References Cited

U.S. PATENT DOCUMENTS

| | | | |
|---|---|---|---|
| 2016/0285716 A1 | 9/2016 | Pelletier et al. | |
| 2017/0134998 A1 | 5/2017 | Xu et al. | |
| 2018/0049079 A1 | 2/2018 | Ozturk et al. | |
| 2019/0007875 A1 | 1/2019 | Gheorghiu et al. | |
| 2019/0124566 A1 | 4/2019 | Liu et al. | |
| 2019/0149421 A1* | 5/2019 | Jin | H04L 5/0078 370/331 |
| 2019/0274077 A1* | 9/2019 | Suzuki | H04W 36/0072 |
| 2020/0022043 A1* | 1/2020 | Pelletier | H04W 36/305 |
| 2020/0053610 A1* | 2/2020 | Lyu | H04W 36/0069 |
| 2020/0314717 A1* | 10/2020 | Kim | H04W 36/18 |
| 2021/0051548 A1 | 2/2021 | Ozturk et al. | |

FOREIGN PATENT DOCUMENTS

| | | |
|---|---|---|
| JP | 2019068177 A | 4/2019 |
| KR | 20150037821 A | 4/2015 |
| WO | 2009039215 A2 | 3/2009 |
| WO | 2010073830 A1 | 7/2010 |
| WO | 2016140757 | 9/2016 |
| WO | 2018141230 A1 | 8/2018 |
| WO | 2018175719 A1 | 9/2018 |

OTHER PUBLICATIONS

International Search Report and Written Opinion—PCT/US2020/070263—ISA/EPO—Oct. 30, 2020.
Nokia, et al., "Analysis of DAPS Operation", R2-1909036, 3GPP TSG-RAN WG2 Meeting #107, Prague, Czech Republic, Aug. 26-30, 2019, 6 Pages.
Nokia, et al., "Mobility Robustness for Two Active Protocol Stack Solution", R2-1909039, 3GPP TSG RAN WG2 Meeting #107, Prague, Czech Republic, Aug. 26-30, 2019, 5 Pages.
Partial International Search Report—PCT/US2020/070263—ISA/EPO—Sep. 9, 2020.
Taiwan Search Report—TW109123537—TIPO—Dec. 9, 2023.
Qualcomm Incorporated: "Lte Mobility Enhancements for eMBB HO Using Dual Active Protocol Stack", 3GPP Draft, 3GPP TSG-RAN WG2 Meeting #106, R2-1906378 LTE Mobility Enhancements for EMBB HO Using Dual Active Protocol Stack_V1, 3rd Generation Partnership Project (3GPP), Mobile Competence Centre, 650, Route Des Lucioles, F-0692, vol. RAN WG2, No. Reno, USA, May 13, 2019-May 17, 2019 May 13, 2019 (May 13, 2019), XP051729843, 10 Pages, the whole document.
Sharp: "Consideration for Protocol Stack and UL Data Handling", R2-1908051, 3GPP TSG RAN WG2 #106 Reno, USA, May 13-17, 2019, pp. 1-3.
Vivo: "ROHC Procedure for Both Single and Dual Active Protocol Solutions", R2-1905976, 3GPP TSG-RAN WG2 Meeting #106 Reno, USA, May 13-May 17, 2019, 6 Pages.
Mediatek Inc, et al., "Supprt Dual Active Protocol Stacks to Minimize HO Interruption", 3GPP TSG RAN WG2 Meeting #106, R2-1905892, Reno, USA, May 13, 2019-May 17, 2019, May 3, 2019, 10 pages.
European Search Report—EP25152200—Search Authority—Munich—Mar. 17, 2025.

* cited by examiner

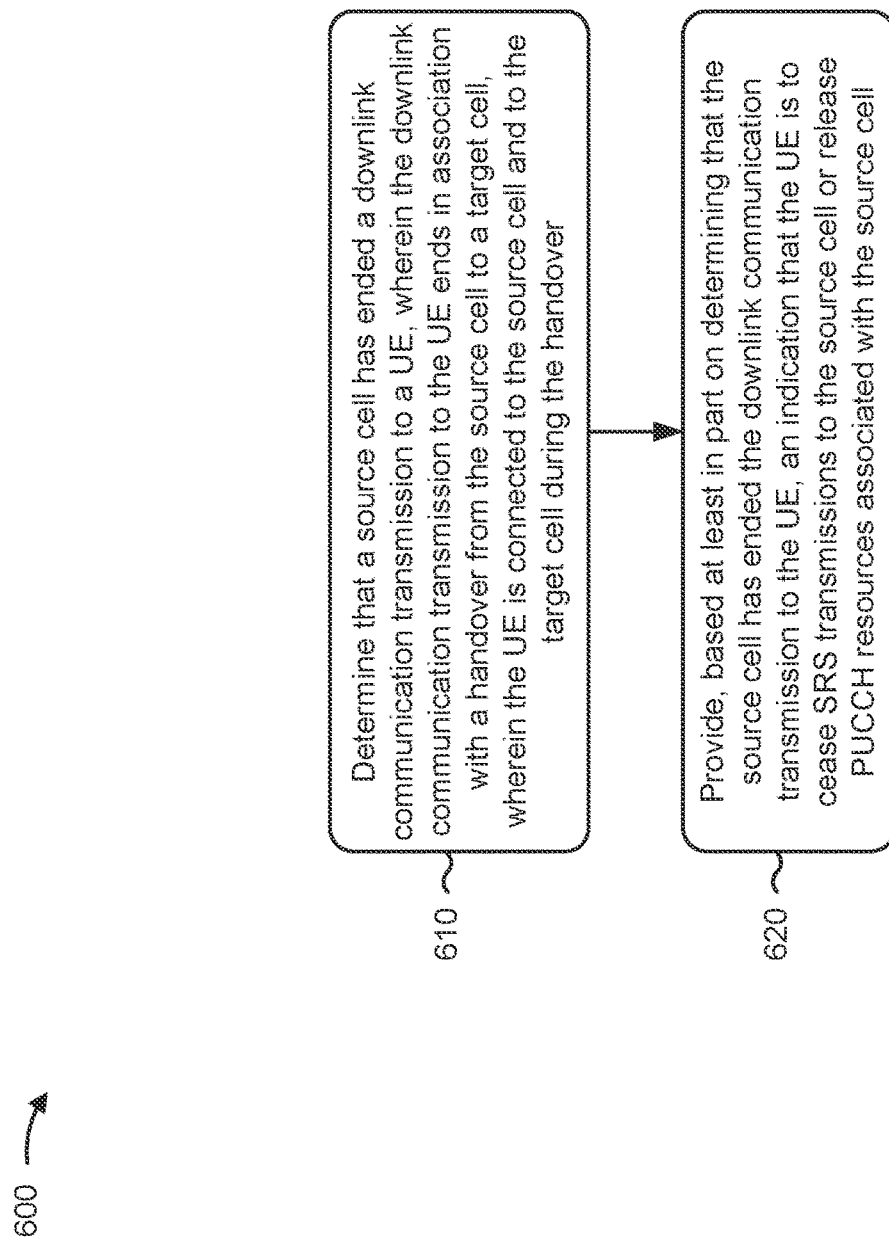

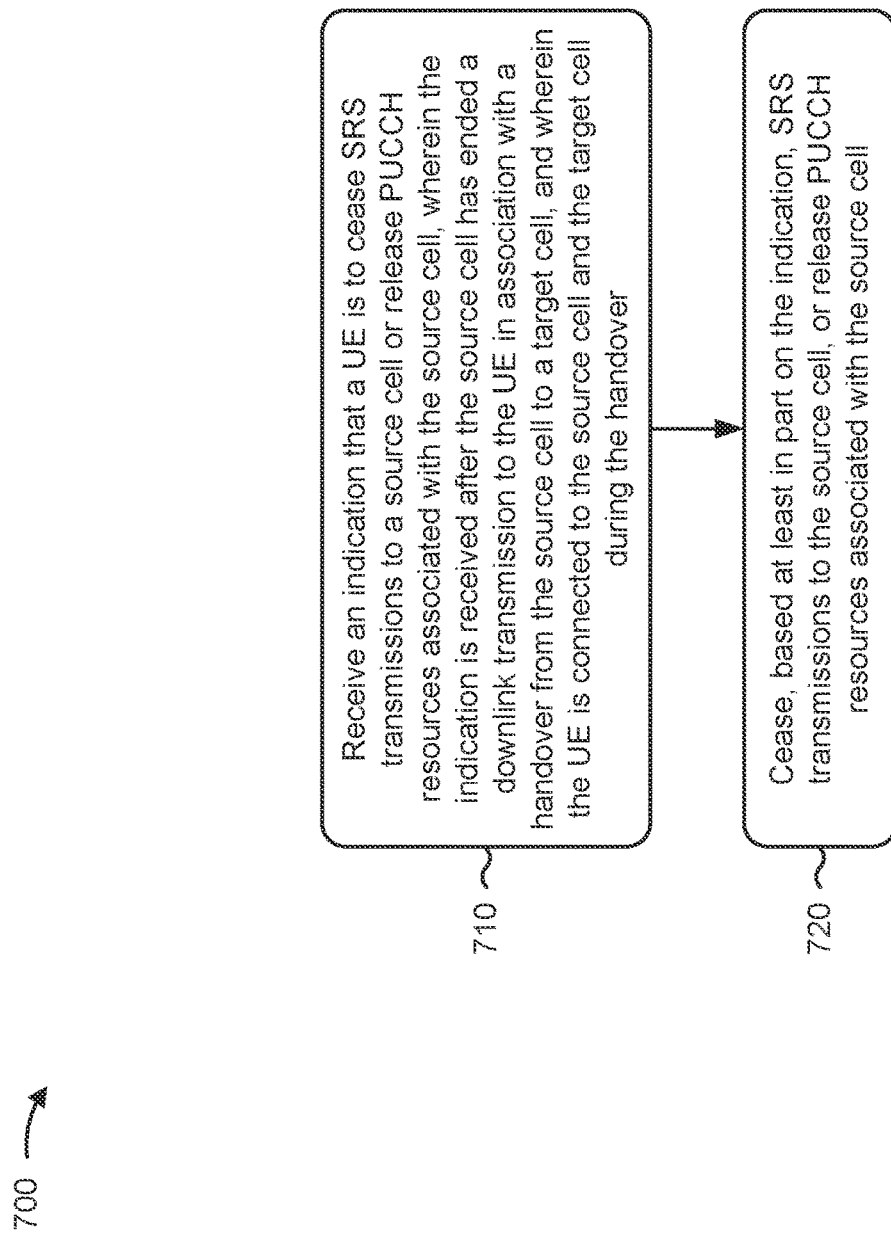

UPLINK SWITCHING FOR ENHANCED MOBILITY

CROSS-REFERENCE TO RELATED APPLICATIONS

This application is a continuation of U.S. patent application Ser. No. 16/946,911, filed Jul. 10, 2020 (now U.S. Pat. No. 11,317,331), entitled "UPLINK SWITCHING FOR ENHANCED MOBILITY," which claims priority to U.S. Provisional Patent Application No. 62/886,221, filed on Aug. 13, 2019, entitled "UPLINK SWITCHING FOR ENHANCED MOBILITY," the contents of which are incorporated herein by reference in their entireties.

TECHNICAL FIELD

Aspects of the present disclosure relate generally to wireless communication, and more particularly to techniques for uplink switching for enhanced mobility.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by a user equipment (UE). The method may include detecting a trigger to switch from a source cell to a target cell for transmitting physical uplink shared channel (PUSCH) communications, where the trigger is detected in association with a handover from the source cell to the target cell, where the UE is connected to the source cell and to the target cell during the handover; and switching from the source cell to the target cell for transmitting PUSCH communications based at least in part on detecting the trigger.

In some aspects, the trigger is associated with a radio resource control (RRC) reconfiguration complete message provided to the target cell. In some aspects, switching from the source cell to the target cell is based at least in part on upon receiving an acknowledgment (ACK) of the RRC reconfiguration complete message. In some aspects, switching from the source cell to the target cell is based at least in part on upon receiving a physical downlink control channel (PDCCH) addressed to a cell radio network temporary identifier (C-RNTI) associated with the UE.

In some aspects, the trigger is associated with the UE being scheduled for a transmission of a PUSCH communication. In some aspects, switching from the source cell to the target cell is based at least in part on upon receiving downlink control information (DCI) including a PUSCH grant associated with the PUSCH communication. In some aspects, switching from the source cell to the target cell occurs at a time of a first configured grant occasion associated with the PUSCH communication. In some aspects, switching from the source cell to the target cell occurs at a time of a PUSCH grant associated with the PUSCH communication.

In some aspects, the trigger is associated with a configuration of the UE.

In some aspects, switching from the source cell to the target cell is based at least in part on an assessment of channel conditions.

In some aspects, switching from the source cell to the target cell for transmitting PUSCH communications occurs at substantially a same time that the UE switches from the source cell to the target cell for receiving downlink communications.

In some aspects, the method can include transmitting PUSCH communications, physical uplink control channel (PUCCH) communications, and sounding reference signal (SRS) transmissions to the source cell until switching from the source cell to the target cell.

In some aspects, the UE is to continue to transmit PUCCH communications and SRS transmissions to the source cell for a period of time after the UE switches from the source cell to the target cell.

In some aspects, information indicating that the UE has ended transmissions of uplink communications to the source cell is provided to the source cell. In some aspects, the information indicating that the UE has ended transmissions of uplink communications to the source cell is provided by the UE via at least one of RRC signaling, a medium access control (MAC) control element, or a PUCCH format. In some aspects, the information indicating that the UE has ended transmissions of uplink communications to the source cell is provided by the target cell. In some aspects, an uplink data packet is forwarded from the source cell to the target cell based at least in part on the information indicating that the UE has ended transmissions of uplink communications to the source cell.

In some aspects, the method can include switching from a limited capability mode to a full capability mode based at least in part on switching from the source cell to the target cell for transmitting PUSCH communications. In some aspects, information indicating that the UE has switched to the full capability mode is provided to the target cell.

Another innovative aspect of the subject matter described in this disclosure can be implemented in a UE for wireless communication. The UE may include memory and one or more processors operatively coupled to the memory. The memory and the one or more processors may be configured to detect a trigger to switch from a source cell to a target cell for transmitting PUSCH communications, where the trigger is detected in association with a handover from the source cell to the target cell, where the UE is connected to the source cell and to the target cell during the handover; and execute a switch from the source cell to the target cell for transmitting PUSCH communications based at least in part on detecting the trigger.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to detect a trigger to switch from a source cell to a target cell for transmitting PUSCH communications, where the trigger is detected in association with a handover from the source cell to the target cell, where the UE is connected to the source cell and to the target cell during the handover; and switch from the source cell to the target cell for transmitting PUSCH communications based at least in part on detecting the trigger.

Another innovative aspect of the subject matter described in this disclosure can be implemented in an apparatus for wireless communication. The apparatus may include means for detecting a trigger to switch from a source cell to a target cell for transmitting PUSCH communications, where the trigger is detected in association with a handover from the source cell to the target cell, where the apparatus is connected to the source cell and to the target cell during the handover; and means for switching from the source cell to the target cell for transmitting PUSCH communications based at least in part on detecting the trigger.

Another innovative aspect of the subject matter described in this disclosure can be implemented in a method of wireless communication performed by a base station. The method may include determining that a source cell has ended a downlink communication transmission to a UE, where the downlink communication transmission to the UE ends in association with a handover from the source cell to a target cell, where the UE is connected to the source cell and to the target cell during the handover; and providing, based at least in part on determining that the source cell has ended the downlink communication transmission to the UE, an indication that the UE is to cease SRS transmissions to the source cell, or release PUCCH resources associated with the source cell.

In some implementations, the indication is provided via at least one of a MAC control element, a PDCCH, or RRC signaling.

In some aspects, the indication includes information indicating that the source cell has ended the downlink communication transmission to the UE.

In some aspects, the indication is an explicit indication to cease the SRS transmissions to the source cell to release the PUCCH resources associated with the source cell.

In some aspects, the UE is to switch from a limited capability mode to a full capability mode based at least in part on the indication that the UE is to cease the SRS transmissions to the source cell, or to release the PUCCH resources associated with the source cell. In some aspects, when the UE switches to the full capability mode, an indicator is provided to the target cell.

In some aspects, the UE is to cease monitoring and reception of downlink transmissions from the source cell based at least in part on the indication that the UE is to cease the SRS transmissions to the source cell, or to release the PUCCH resources associated with the source cell.

Another innovative aspect of the subject matter described in this disclosure can be implemented in a base station for wireless communication. The base station may include memory and one or more processors operatively coupled to the memory. The memory and the one or more processors may be configured to determine that a source cell has ended a downlink communication transmission to a UE, where the downlink communication transmission to the UE ends in association with a handover from the source cell to a target cell, where the UE is connected to the source cell and to the target cell during the handover; and provide, based at least in part on determining that the source cell has ended the downlink communication transmission to the UE, an indication that the UE is to cease SRS transmissions to the source cell, or release PUCCH resources associated with the source cell.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a base station, may cause the one or more processors to determine that a source cell has ended a downlink communication transmission to a UE, where the downlink communication transmission to the UE ends in association with a handover from the source cell to a target cell, where the UE is connected to the source cell and to the target cell during the handover; and provide, based at least in part on determining that the source cell has ended the downlink communication transmission, an indication that the UE is to cease SRS transmissions to the source cell, or release PUCCH resources associated with the source cell.

Another innovative aspect of the subject matter described in this disclosure can be implemented in an apparatus for wireless communication. The apparatus may include means for determining that a source cell has ended a downlink communication transmission to a UE, where the downlink communication transmission to the UE ends in association with a handover from the source cell to a target cell, where the UE is connected to the source cell and to the target cell during the handover; and means for providing, based at least in part on determining that the source cell has ended the downlink communication transmission to the UE, an indication that the UE is to cease SRS transmissions to the source cell, or release PUCCH resources associated with the source cell.

Another innovative aspect of the subject matter described in this disclosure can be implemented in a method of wireless communication performed by a UE. The method may include receiving an indication that the UE is to cease SRS transmissions to a source cell or release PUCCH resources associated with the source cell, where the indication is received after the source cell has ended a downlink transmission to the UE in association with a handover from the source cell to a target cell, and where the UE is connected to the source cell and the target cell during the handover; and ceasing, based at least in part on the indication, SRS transmissions to the source cell, or releasing PUCCH resources associated with the source cell.

In some aspects, the indication is received via at least one of a MAC control element, a PDCCH, or RRC signaling.

In some aspects, the indication includes information indicating that the source cell has ended the downlink transmission to the UE.

In some aspects, the indication is an explicit indication to cease the SRS transmissions to the source cell, or to release the PUCCH resources associated with the source cell.

In some aspects, the method can include switching from a limited capability mode to a full capability mode based at least in part on the indication that the UE is to cease the SRS transmissions to the source cell, or to release the PUCCH resources associated with the source cell. In some aspects, when the UE switches to the full capability mode, an indicator is provided to the target cell.

In some aspects, the method can include ceasing monitoring and reception of downlink transmissions from the source cell based at least in part on the indication that the UE is to cease the SRS transmissions to the source cell, or to release the PUCCH resources associated with the source cell.

Another innovative aspect of the subject matter described in this disclosure can be implemented in a UE for wireless communication. The UE may include memory and one or more processors operatively coupled to the memory. The memory and the one or more processors may be configured to receive an indication that the UE is to cease SRS transmissions to a source cell or release PUCCH resources associated with the source cell, where the indication is received after the source cell has ended a downlink transmission to the UE in association with a handover from the source cell to a target cell, and where the UE is connected to the source cell and the target cell during the handover; and cease, based at least in part on the indication, SRS transmissions to the source cell, or release PUCCH resources associated with the source cell.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive an indication that the UE is to cease SRS transmissions to a source cell or release PUCCH resources associated with the source cell, where the indication is received after the source cell has ended a downlink transmission to the UE in association with a handover from the source cell to a target cell, and where the UE is connected to the source cell and the target cell during the handover; and cease, based at least in part on the indication, SRS transmissions to the source cell, or release PUCCH resources associated with the source cell.

Another innovative aspect of the subject matter described in this disclosure can be implemented in an apparatus for wireless communication. The apparatus may include means for receiving an indication that the apparatus is to cease SRS transmissions to a source cell or release PUCCH resources associated with the source cell, where the indication is received after the source cell has ended a downlink transmission to the apparatus in association with a handover from the source cell to a target cell, and where the apparatus is connected to the source cell and the target cell during the handover; and means for ceasing, based at least in part on the indication, SRS transmissions to the source cell, or releasing PUCCH resources associated with the source cell.

Aspects generally include a method, apparatus, system, computer program product, non-transitory computer-readable medium, user equipment, base station, wireless communication device, or processing system as substantially described herein with reference to and as illustrated by the accompanying drawings and specification.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 6 is a diagram illustrating an example process performed, for example, by a BS.

FIG. 7 is a diagram illustrating an example process performed, for example, by a UE.

Like reference numbers and designations in the various drawings indicate like elements.

DETAILED DESCRIPTION

Figure 1:
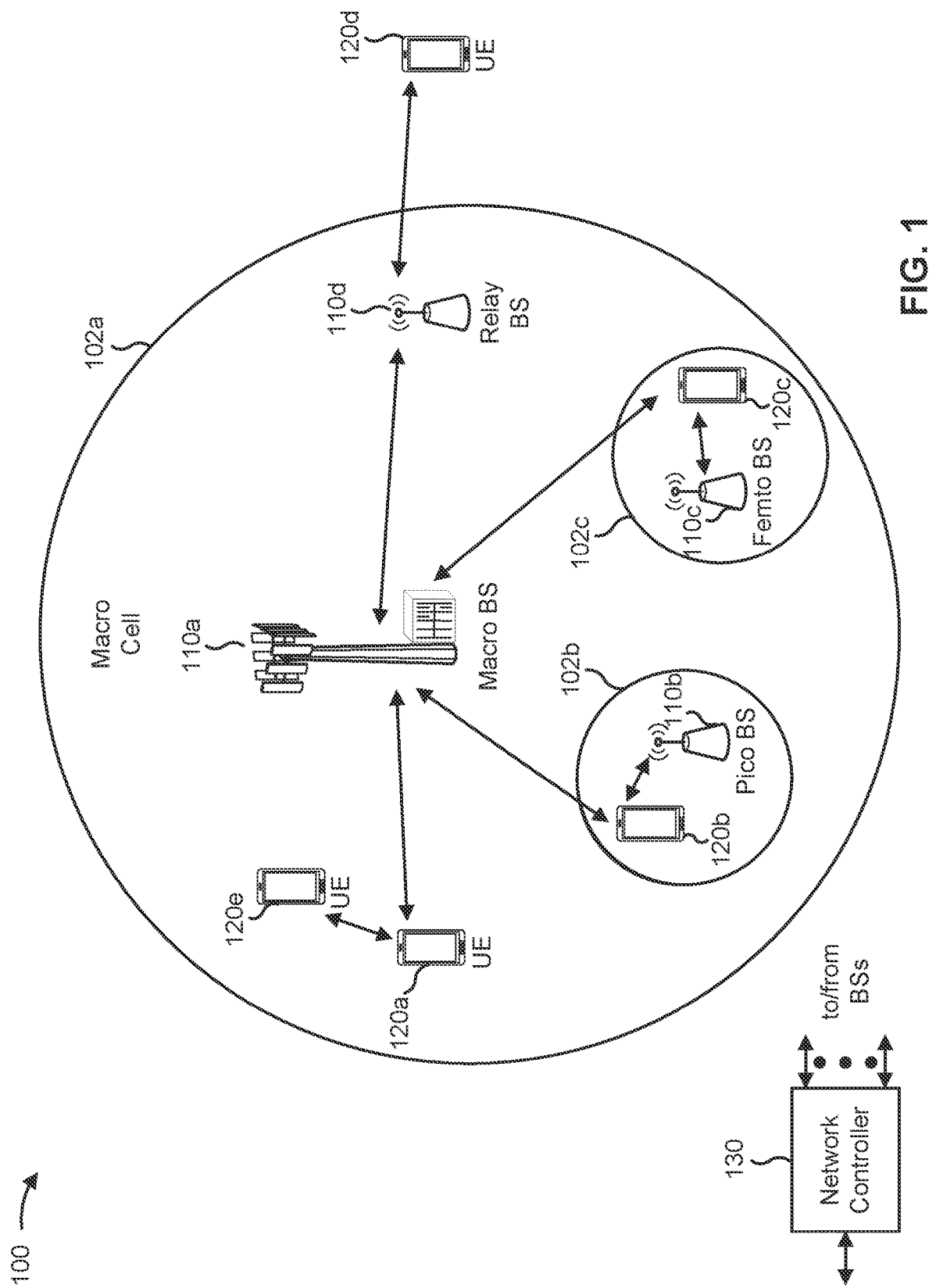
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In a wireless communication system, such as an LTE system or a New Radio (NR) system, a handover may cause a user equipment (UE) to be handed over from a source cell to a target cell. In a conventional wireless communication system, the UE disconnects from the source cell and then connects to the target cell (i.e., the UE is not connected to both the source cell and the target cell at any time during the handover). However, this conventional technique often results in service interruption since the UE, after disconnection from the source and before establishment of the connection with the target cell is complete, is not connected to any cell.

Providing mobility enhancements that reduce the service interruption experienced during a handover (such as to 0 milliseconds (ms), or as close as possible to 0 ms) may be desirable. Such a reduction in handover interruption may, in some cases, be enabled by configuring the UE to maintain a connection to both the source cell (such as a cell from which the UE is being handed over) and the target cell (such as a cell to which the UE is being handed over) during the handover. Being concurrently connected to both the source cell and the target cell can reduce service interruption (such as communication latency) because the UE will remain connected to both cells such that the UE can communicate with the source cell or the target cell. For downlink communications, the UE may receive downlink transmissions from both the source cell and the target cell while connected to both the source cell and the target cell.

Managing uplink communication may be challenging when the UE is connected to both the source cell and the target cell. For example, when the UE has a single antenna, and in some cases even when the UE has multiple antennas, transmitting uplink communications on the same frequency to different base stations (BSs) (such as a base station associated with the source cell and a base station associated with the target cell) may not be performed easily. Further, even when configuring the UE to transmit to different BSs on the same frequency is possible, issues arise on the network side because uplink data associated with a given uplink communication may be received at different BSs. To address this issue, the UE may be configured to refrain from transmitting on an uplink data channel (such as a physical uplink shared channel (PUSCH)) to both the source cell and the target cell. Thus, there should be point at which the UE switches from the source cell to the target cell for transmitting PUSCH communications. A manner in which the UE switches from the source cell to the target cell for transmitting PUSCH communications to minimize service interruption needs to be defined. Some aspects described herein provide techniques and apparatuses for uplink switching for enhanced mobility.

In some aspects, a UE may detect a trigger to switch from a source cell to a target cell for transmitting PUSCH communications. Here, the UE may detect the trigger in association with a handover from the source cell to the target cell, and the UE may be connected to the source cell and to the target cell during the handover. The UE may switch from the source cell to the target cell for transmitting PUSCH communications based at least in part on detecting the trigger.

Particular implementations of the subject matter described in this disclosure can be implemented to realize one or more of the following potential advantages. In some aspects, service interruption experienced during a handover may be reduced or eliminated. Further, simplified or improved uplink communications may be provided while a UE is connected to both a source cell and a target cell during a handover.

Another issue when a UE is connected to both a source cell and a target cell during a handover is that the UE should cease transmitting an uplink reference signal (such as sounding reference signal (SRS)) and release uplink control resources (such as physical uplink control channel (PUCCH) resources) associated with the source cell after the source cell has ended transmissions of downlink communications to the UE. For example, since SRS transmissions and PUCCH resources are used in association with downlink communications, the SRS transmission and PUCCH resources are often no longer needed after the source cell has ended transmissions of downlink communications to the UE.

In some aspects, as described herein, a UE may receive an indication that the UE is to cease SRS transmissions to a source cell or to release PUCCH resources associated with a source cell. Here, the UE may receive the indication after the source cell has ended transmission of downlink communications to the UE in association with a handover from the source cell to a target cell, and the UE may be connected to the source cell and the target cell during the handover. The UE may cease SRS transmissions to the source cell or release PUCCH resources associated with the source cell based at least in part on the indication.

Particular implementations of the subject matter described in this disclosure can be implemented to realize one or more of the following potential advantages. In some aspects, ceasing SRS transmission or releasing PUCCH resources may reduce power consumption because, for example, the UE need not transmit the SRS or maintain reservation of the PUCCH resources. Further, in some aspects, resource utilization may be improved because, for example, SRS resources associated with the SRS transmissions, or the PUCCH can be reused for a transmission by another device (such as configured by the network).

FIG. 1 is a block diagram conceptually illustrating an example of a wireless network 100. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
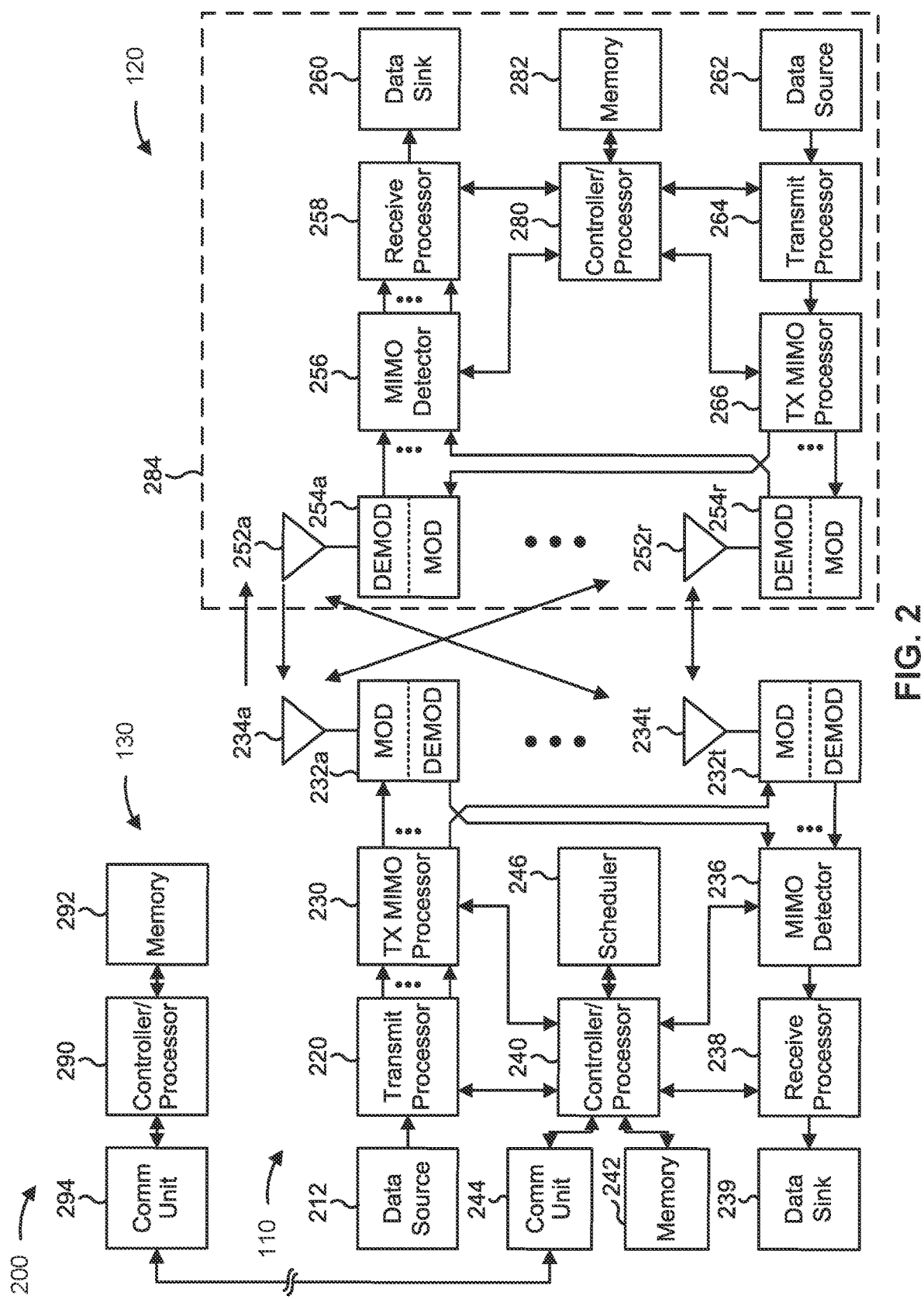
FIG. 2 is a block diagram conceptually illustrating an example of a base station (BS) in communication with a user equipment (UE) in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DE-MODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

The controller/processor 240 of base station 110, the controller/processor 280 of the UE 120, or any other component(s) of FIG. 2 may perform one or more techniques associated with uplink switching for enhanced mobility, as described in more detail elsewhere herein. For example, the controller/processor 240 of the base station 110, the controller/processor 280 of UE 120, or any other component(s) (or combinations of components) of FIG. 2 may perform or direct operations of, for example, process 500 of FIG. 5, process 600 of FIG. 6, process 700 of FIG. 7, or other processes as described herein. The memories 242 and 282 may store data and program codes for base station 110 and UE 120, respectively. A scheduler 246 may schedule UEs for data transmission on the downlink, the uplink, or a combination thereof.

In some implementations, the controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the controller/processor 240 may be a component of a processing system. A processing system may generally refer to a system or series of machines or components that receives inputs and processes the inputs to produce a set of outputs (which may be passed to other systems or components of, for example, the base station 110). For example, a processing system of the base station 110 may refer to a system including the various other components or subcomponents of the base station 110.

The processing system of the base station 110 may interface with other components of the base station 110, and may process information received from other components (such as inputs or signals), output information to other components, etc. For example, a chip or modem of the base station 110 may include a processing system, a first interface to receive or obtain information, and a second interface to output, transmit or provide information. In some cases, the first interface may refer to an interface between the processing system of the chip or modem and a receiver, such that the base station 110 may receive information or signal inputs, and the information may be passed to the processing system. In some cases, the second interface may refer to an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit or provide information.

Figure 5:
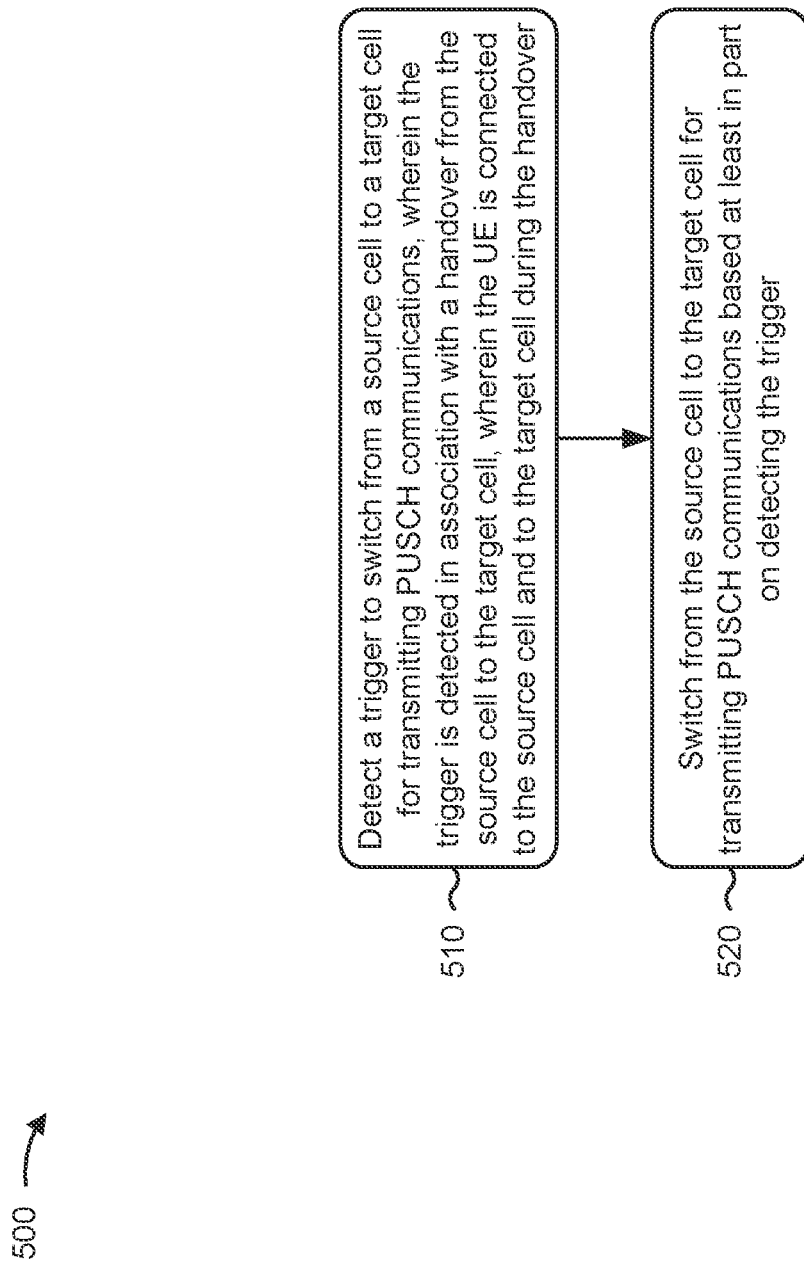
FIG. 5 is a diagram illustrating an example process performed, for example, by a UE.

The stored program codes, when executed by the controller/processor 280 or other processors and modules at the UE 120, may cause the UE 120 to perform operations described with respect to the process 500 of FIG. 5, the process 700 of FIG. 7, or other processes as described herein. The stored program codes, when executed by the controller/processor 240 or other processors and modules at the base station 110, may cause the base station 110 to perform operations described with respect to the process 600 of FIG. 6 or other processes as described herein. A scheduler 246 may schedule UEs for data transmission on the downlink, the uplink, or a combination thereof.

The UE 120 may include means for performing one or more operations described herein, such as the process 500 of FIG. 5, the process 700 of FIG. 7, or other processes as described herein. In some aspects, such means may include one or more components of UE 120 described in connection with FIG. 2.

The base station 110 may include means for performing one or more operations described herein, such as the process 600 of FIG. 6 or other processes as described herein. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
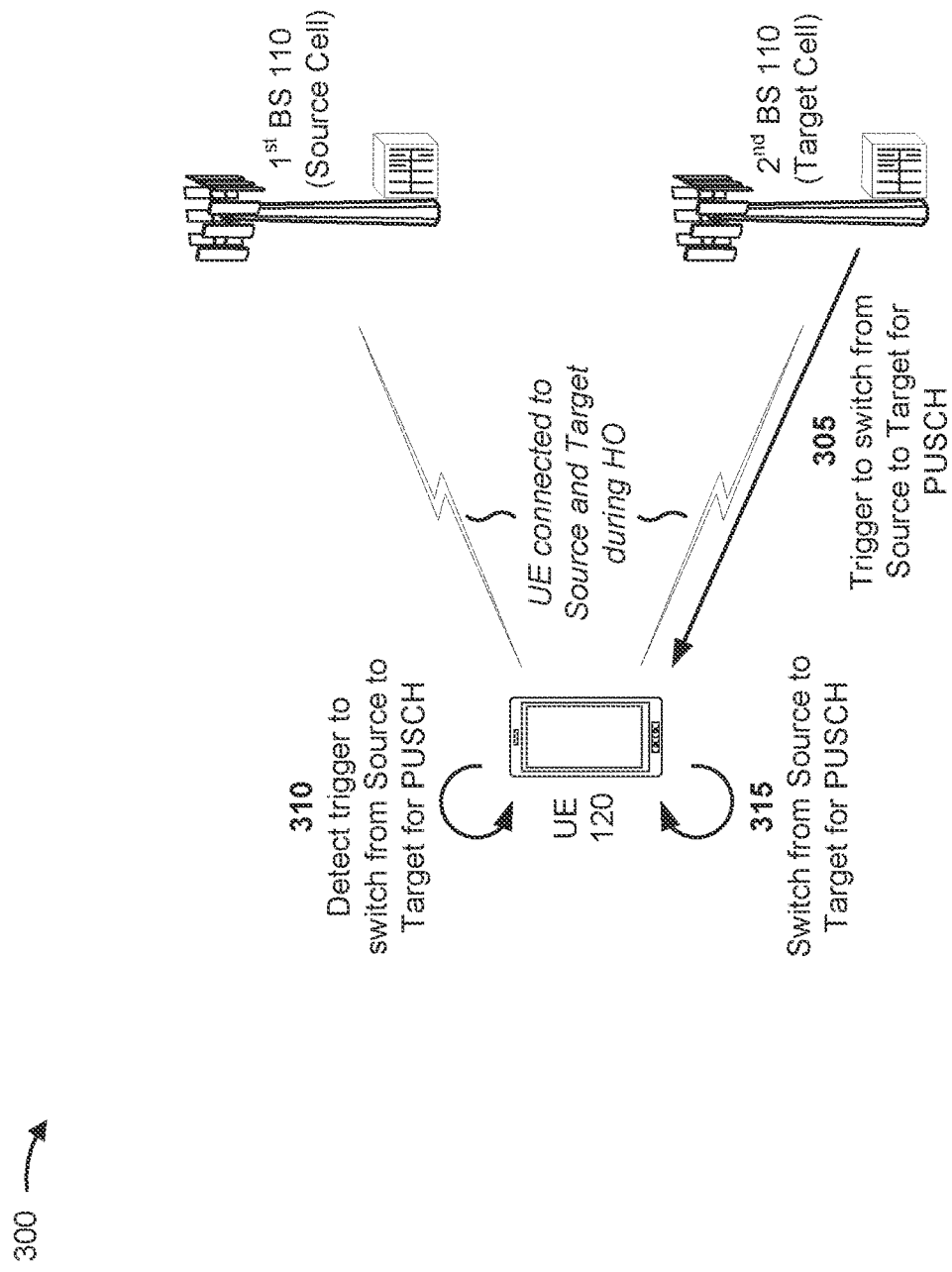
FIG. 3 is a diagram illustrating an example associated with a UE switching from a source cell to a target cell for transmitting physical uplink shared channel (PUSCH) communications.

FIG. 3 is a diagram illustrating an example 300 associated with a UE 120 switching from a source cell to a target cell for transmitting PUSCH communications. The example 300 may occur when the UE 120 is connected to the source cell and to the target cell during a handover. The UE 120 of FIG. 3 can be an implementation of the UE 120 depicted and described in FIGS. 1 and 2.

In FIG. 3, the UE 120 is being handed over from a source cell (such as a cell associated with a first base station 110, which can be an implementation of the base station 110 depicted and described in FIGS. 1 and 2) to a target cell (such as a cell associated with a second base station 110, which can be an implementation of the base station 110 depicted and described in FIGS. 1 and 2). As indicated in FIG. 3, and as described above, the UE 120 may be connected to both the source cell and the target cell during the handover (HO) from the source cell to the target cell.

As shown by reference number 305, the target cell may, in association with the handover from the source cell to the target cell, provide a trigger associated with the UE 120 switching from the source cell to the target cell for transmitting PUSCH communications. As shown, by reference number 310, the UE 120 may detect the trigger to switch from the source cell to the target cell for transmitting PUSCH communications. Notably, in some aspects, the providing of the trigger by the target cell is not required. In such cases, the UE 120 may detect the trigger in another manner, such as based at least in part on a configuration of the UE 120, as described below.

In some aspects, the trigger may be associated with a radio resource control (RRC) reconfiguration complete message provided to the target cell. For example, such as in the case of a two-step random access procedure, the target cell may receive an RRC reconfiguration complete message (such as msgA) transmitted by the UE 120 in association with the performing the handover and may provide, to the UE 120, a response indicating that the RRC reconfiguration complete message was received.

Here, the response indicating that the RRC reconfiguration complete message was received may serve as the trigger. In some aspects, the response indicating that the RRC reconfiguration complete message was received may include, for example, an acknowledgment (ACK) of the RRC reconfiguration complete message (such as a layer 1 ACK, a layer 2 ACK). In such a case, the UE 120 may receive the ACK, and the ACK may be the trigger associated with causing the UE 120 to switch (that is, execute a switch) from the source cell to the target cell for transmitting PUSCH communications. As another example, the target cell may receive the RRC reconfiguration complete message transmitted by the UE 120 and may provide a physical downlink control channel (PDCCH) addressed to an identifier associated with the UE 120 (such as a cell radio network temporary identifier (C-RNTI) associated with the UE 120). Here, the UE 120 may receive the PDCCH based at least in part on the PDCCH being addressed to the identifier associated with the UE 120, and the PDCCH may be the trigger associated with causing the UE 120 to switch from the source cell to the target cell for transmitting PUSCH communications. As another example, such as in the case of a four-step random access procedure, the UE 120 may provide an RRC reconfiguration complete message (such as msg3) in association with the performing the handover. Here, the transmission of the RRC reconfiguration complete message may serve as the trigger. That is, in some aspects, the transmission of the RRC reconfiguration complete message itself may act as the trigger to switch from the source cell to the target cell for transmitting PUSCH communications.

In some aspects, the trigger may be associated with the UE 120 being scheduled for a transmission of a PUSCH communication. For example, the UE 120 may receive downlink control information (DCI) including a PUSCH grant associated with a PUSCH communication. Here, the PUSCH grant associated with the PUSCH communication may act as the trigger associated with causing the UE 120 to switch from the source cell to the target cell for transmitting PUSCH communications. As another example, the UE 120 may be scheduled (such as based at least in part on information received in a handover command) for a transmission of PUSCH communication based at least in part on a configured grant. Here, timing of the first configured grant occasion may act as the trigger associated with causing the UE 120 to switch from the source cell to the target cell for transmitting PUSCH communications. In other words, in some aspects, the trigger may cause the UE 120 to switch from the source cell to the target cell for transmitting PUSCH communications at a time of a first configured grant occasion associated with the PUSCH communication. As another example, the UE 120 may be scheduled for a transmission of PUSCH communication based at least in part on a PUSCH grant. Here, timing of the PUSCH grant may act as the trigger associated with the UE 120 to switch from the source cell to the target cell for transmitting PUSCH communications. In other words, in some aspects, the trigger may cause the UE 120 to switch from the source cell to the target cell for transmitting PUSCH communications at a time of a PUSCH grant associated with the PUSCH communication.

In some aspects, the trigger to switch from the source cell to the target cell for transmitting PUSCH communications may be left to UE implementation. That is, in some aspects, the trigger may be associated with a configuration of the UE 120. For example, the trigger may be based at least in part on an assessment of channel conditions as determined by the UE 120 (i.e., the switching may be based at least in part on the assessment of channel conditions). As another example, the trigger may be based at least in part on the UE 120 switching from the source cell to the target cell for downlink communication (i.e., the trigger may cause the UE 120 to switch from the source cell to the target cell for PUSCH communications at a same time that the UE 120 switches from the source cell to the target cell for receiving downlink communications).

As further shown in FIG. 3 by reference number 315, the UE 120 may switch from the source cell to the target cell for transmitting PUSCH communications based at least in part on detecting the trigger. In some aspects, the UE 120 may switch from the source cell to the target cell for transmitting PUSCH communications carrying data to be processed for transmission after the switching from the source cell to the target cell (that is, data that is not in the process of being transmitted). That is, the UE 120 may switch from the source cell to the target cell for transmitting PUSCH communications carrying new data, and may not switch from the source cell to the target cell for transmitting ongoing PUSCH communications (that is, PUSCH communications already in the process of being transmitted).

In some aspects, the UE 120 may transmit PUSCH communications, PUCCH communications, or SRS transmissions to the source cell until switching from the source cell to the target cell. That is, in some aspects, the UE 120 may continue to transmit PUSCH communications, PUCCH communications, or SRS transmissions to the source cell until the UE 120 switches from the source cell to the target cell for transmitting PUSCH communications.

In some aspects, the UE 120 may be configured to continue to transmit PUCCH communications or SRS transmissions to the source cell for a period of time after the UE 120 switches from the source cell to the target cell. Such a configuration may be used because, for example, downlink transmissions from the source cell may continue after the UE 120 switches from the source cell to the target cell for transmitting PUSCH communications.

In some aspects, information indicating that the UE 120 has ended transmissions of uplink communications to the source cell may be provided to the source cell. In some aspects, the UE 120 may provide the information indicating that the UE 120 has ended uplink communications to the source cell. In some aspects, the UE 120 may provide such information via, for example, RRC signaling (such as layer 3 signaling), a medium access control (MAC) control element (such as layer 2 signaling), or via a PUCCH format to the source cell (such as layer 1 signaling). In some aspects, the target cell may provide the information indicating that the UE 120 has ended uplink communications to the source cell. In some aspects, the target cell may provide such information when, for example, the target cell schedules a PUSCH grant associated with the UE 120. In some aspects, based at least in part on the indication that the UE 120 has ended transmission of uplink communications to the source cell, the source cell may cease providing uplink grants to the UE 120 or may begin forwarding uplink data, associated with the UE 120, to the target cell.

In some aspects, the UE 120 may switch from a limited capability mode to a full capability mode based at least in part on switching from the source cell to the target cell for transmitting PUSCH communications. For example, after switching from the source cell to the target cell for transmitting PUSCH communications and for receiving downlink communications, the UE 120 may switch from the limited capability mode to the full capability mode. In some aspects, switching from the limited capability mode to the full capability mode may include, for example, moving all antennas from the source cell to the target cell, updating a number of monitored cells, updating a monitored bandwidth, or modifying one or more other configurations of the UE 120. In some aspects, information indicating that the UE 120 has switched to the full capability mode may be provided to the target cell (such as via a MAC control element, an RRC message). In some aspects, based at least in part on this information, the target cell may begin scheduling the UE 120 at full capability.

Figure 4:
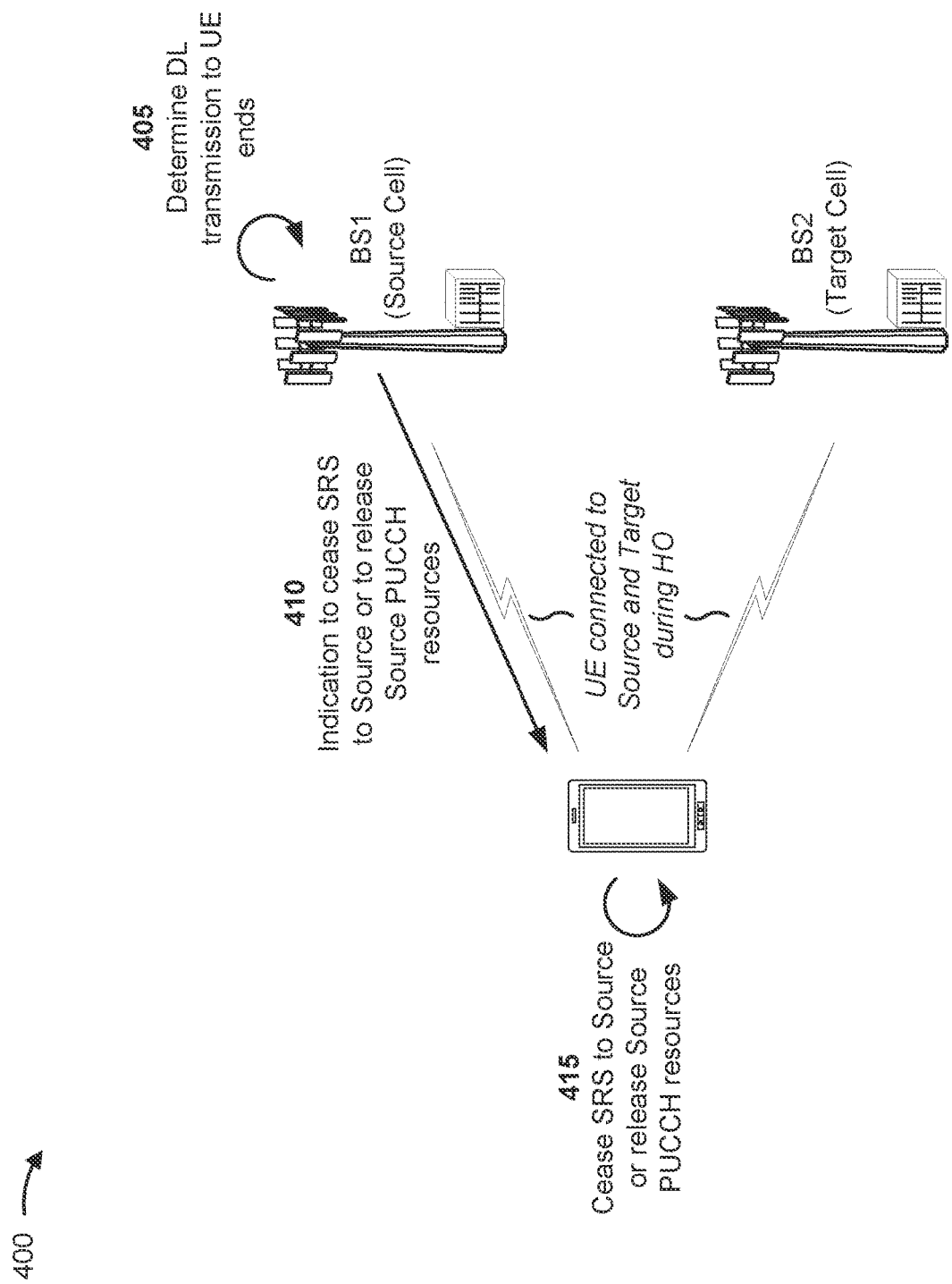
FIG. 4 is a diagram illustrating an example associated with a UE ceasing sounding reference signal (SRS) transmissions to a source cell or releasing physical uplink control channel (PUCCH) resources after the source cell has ended transmission of downlink communications to the UE.

FIG. 4 is a diagram illustrating an example 400 associated with a UE 120 ceasing SRS transmissions to a source cell or releasing PUCCH resources after the source cell has ended transmission of downlink communications to the UE 120. The example 400 may occur in association with a handover from the source cell to a target cell during which the UE 120 is connected to the source cell and the target cell. The UE 120 of FIG. 4 can be an implementation of the UE 120 depicted and described in FIGS. 1 and 2.

In FIG. 4, the UE 120 is being handed over from a source cell (such as a cell associated with a first base station 110, which can be an implementation of the base station 110 depicted and described in FIGS. 1 and 2) to a target cell (such as a cell associated with a second base station 110, which can be an implementation of the base station 110 depicted and described in FIGS. 1 and 2). As indicated in FIG. 4, and as described above, the UE 120 may be connected to both the source cell and the target cell during the handover (HO) from the source cell to the target cell.

As shown by reference number 405, the source cell may determine that the source cell has ended a downlink communication transmission (also referred to herein as a downlink transmission) to the UE 120 in association with a handover of the UE 120 from the source cell to a target cell. For example, the source cell may determine that the source cell does not have any data for the UE 120 and, therefore, that the source cell has ended a downlink communication transmission to the UE 120. As another example, the source cell may detect poor channel conditions (such as which may be the cause of the UE 120 being handed over from the source cell to the target cell) that cause the source cell to cease transmitting downlink communications to the UE 120 and, therefore, may determine to end the downlink communication to the UE 120.

As shown by reference number 410, the source cell may provide, to the UE 120 and based at least in part on determining that the source cell has ended the downlink communication transmission to the UE 120, an indication that the UE 120 is to cease SRS transmissions to the source cell, or to release PUCCH resources associated with the source cell. In some aspects, the indication may be provided via a MAC control element, via a PDCCH, or via RRC signaling.

In some aspects, the indication may be an indication that the source cell has ended the downlink communication transmission to the UE 120. Here, the indication that the source cell has ended the downlink communication transmission to the UE 120 may act as an implicit indication that the UE 120 is to cease SRS transmission to the source cell, or to release PUCCH resources associated with the source cell. Additionally, or alternatively, the indication may include an explicit indication to cease the SRS transmissions to the source cell or to release the PUCCH resources associated with the source cell.

In some aspects, the indication may indicate that the UE 120 is to both cease SRS transmissions to the source cell and release PUCCH resources associated with the source cell. That is, in some aspects, a single indication may be used. In some aspects, the indication may explicitly indicate that the UE 120 is to either cease SRS transmissions to the source cell or release PUCCH resources associated with the source cell. In such a case, the explicit indication to perform one operation may also operate as an implicit indication to perform the other operation. For example, an explicit indication to cease SRS transmissions to the source cell may operate as an implicit indication that the UE 120 is to release PUCCH resources associated with the source cell (such as such that the UE 120 autonomously releases the PUCCH resources associated with the source cell).

As shown by reference number 415, the UE 120 may receive the indication that the UE 120 is to cease SRS transmissions to the source cell or release PUCCH resources associated with the source cell, and may cease SRS transmissions to the source cell or release PUCCH resources associated with the source cell based at least in part on the indication.

In some aspects, the UE 120 may switch from the limited capability mode to the full capability mode based at least in part on the indication that the UE 120 is to cease the SRS transmissions to the source cell, or to release the PUCCH resources associated with the source cell. For example, after ceasing the SRS transmission to the source cell or releasing the PUCCH resources associated with the source cell, the UE 120 may switch from the limited capability mode to the full capability mode. In some aspects, switching from the limited capability mode to the full capability mode may include, for example, moving all antennas from the source cell to the target cell, updating a number of monitored cells, updating a monitored bandwidth, or modifying one or more other configurations of the UE 120. In some aspects, when the UE 120 switches to the full capability mode, an indicator (such as an indicator indicating that the UE 120 has switched to the full capability mode) may be provided to the target cell (such as via a MAC control element, an RRC message). In some aspects, based at least in part on this information, the target cell may begin scheduling the UE 120 at full capability.

In some aspects, the UE 120 may cease monitoring and reception of downlink transmissions from the source cell based at least in part on the indication that the UE 120 is to cease the SRS transmissions to the source cell, or to release the PUCCH resources associated with the source cell (such as since the source cell has determined that the source cell has ended transmissions of downlink communications to the UE 120).

FIG. 5 is a diagram illustrating an example process 500 performed, for example, by a UE. The example process 500 shows where a UE, such as the UE 120, performs operations associated with uplink switching for enhanced mobility.

As shown in FIG. 5, in some aspects, the process 500 may include detecting a trigger to switch from a source cell to a target cell for transmitting PUSCH communications (block 510). For example, the UE (such as by using receive processor 258, transmit processor 264, controller/processor 280, memory 282) may detect a trigger to switch from a source cell to a target cell for transmitting PUSCH communications, as described above. In some aspects, the trigger is detected in association with a handover from the source cell to the target cell. In some aspects, the UE is connected to the source cell and to the target cell during the handover.

As shown in FIG. 5, in some aspects, the process 500 may include switching from the source cell to the target cell for transmitting PUSCH communications based at least in part on detecting the trigger (block 520). For example, the UE (such as by using receive processor 258, transmit processor 264, controller/processor 280, memory 282) may switch from the source cell to the target cell for transmitting PUSCH communications based at least in part on detecting the trigger, as described above.

The process 500 may include additional aspects, such as any single aspect or any combination of aspects described below or in connection with one or more other processes described elsewhere herein.

In a first aspect, the trigger is associated with an RRC reconfiguration complete message provided to the target cell.

In a second aspect, alone or in combination with the first aspect, switching from the source cell to the target cell is based at least in part on upon receiving an ACK of the RRC reconfiguration complete message.

In a third aspect, alone or in combination with one or more of the first and second aspects, switching from the source cell to the target cell is based at least in part on upon receiving a PDCCH addressed to a C-RNTI associated with the UE.

In a fourth aspect, alone or in combination with one or more of the first through third aspects, the trigger is associated with the UE being scheduled for a transmission of a PUSCH communication.

In a fifth aspect, alone or in combination with one or more of the first through fourth aspects, switching from the source cell to the target cell is based at least in part on upon receiving DCI including a PUSCH grant associated with the PUSCH communication.

In a sixth aspect, alone or in combination with one or more of the first through fifth aspects, switching from the source cell to the target cell occurs at a time of a first configured grant occasion associated with the PUSCH communication.

In a seventh aspect, alone or in combination with one or more of the first through sixth aspects, switching from the source cell to the target cell occurs at a time of a PUSCH grant associated with the PUSCH communication.

In an eighth aspect, alone or in combination with one or more of the first through seventh aspects, the trigger is associated with a configuration of the UE.

In a ninth aspect, alone or in combination with one or more of the first through eighth aspects, switching from the source cell to the target cell is based at least in part on an assessment of channel conditions.

In a tenth aspect, alone or in combination with one or more of the first through ninth aspects, switching from the source cell to the target cell for transmitting PUSCH communications occurs at substantially a same time that the UE switches from the source cell to the target cell for receiving downlink communications.

In an eleventh aspect, alone or in combination with one or more of the first through tenth aspects, the UE may transmit PUSCH communications, PUCCH communications, and SRS transmissions to the source cell until switching from the source cell to the target cell.

In a twelfth aspect, alone or in combination with one or more of the first through eleventh aspects, the UE is to continue to transmit PUCCH communications and SRS transmissions to the source cell for a period of time after the UE switches from the source cell to the target cell.

In a thirteenth aspect, alone or in combination with one or more of the first through twelfth aspects, information indicating that the UE has ended transmissions of uplink communications to the source cell is provided to the source cell.

In a fourteenth aspect, alone or in combination with one or more of the first through thirteenth aspects, the information indicating that the UE has ended transmissions of uplink communications to the source cell is provided by the UE via at least one of: RRC signaling, a MAC control element, or a PUCCH format.

In a fifteenth aspect, alone or in combination with one or more of the first through fourteenth aspects, the information indicating that the UE has ended transmissions of uplink communications to the source cell is provided by the target cell.

In a sixteenth aspect, alone or in combination with one or more of the first through fifteenth aspects, an uplink data packet is forwarded from the source cell to the target cell based at least in part on the information indicating that the UE has ended transmissions of uplink communications to the source cell.

In a seventeenth aspect, alone or in combination with one or more of the first through sixteenth aspects, the UE may switch from a limited capability mode to a full capability mode based at least in part on switching from the source cell to the target cell for transmitting PUSCH communications.

In an eighteenth aspect, alone or in combination with one or more of the first through seventeenth aspects, information indicating that the UE has switched to the full capability mode is provided to the target cell.

In a nineteenth aspect, alone or in combination with one or more of the first through eighteenth aspects, the UE switches from the source cell to the target cell for transmitting PUSCH communications carrying data to be processed for transmission after the switching from the source cell to the target cell.

In a twentieth aspect, alone or in combination with one or more of the first through nineteenth aspects, the trigger is associated with the transmission of a RRC reconfiguration complete message by the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a BS. The example process 600 shows where a base station, such as the base station 110, performs operations associated with uplink switching for enhanced mobility.

As shown in FIG. 6, in some aspects, the process 600 may include determining that a source cell has ended a downlink communication transmission to a UE (block 610). For example, the base station (such as by using transmit processor 220, receive processor 238, controller/processor 240, memory 242) may determine that a source cell has ended a downlink communication transmission to a UE, such as the UE 120, as described above. In some aspects, the downlink communication transmission to the UE ends in association with a handover from the source cell to a target cell. In some aspects, the UE is connected to the source cell and to the target cell during the handover.

As shown in FIG. 6, in some aspects, the process 600 may include providing, based at least in part on determining that the source cell has ended the downlink communication transmission to the UE, an indication that the UE is cease SRS transmissions to the source cell, or release PUCCH resources associated with the source cell (block 620). For example, the base station (such as by using transmit processor 220, receive processor 238, controller/processor 240, memory 242) may provide, based at least in part on determining that the source cell has ended the downlink communication transmission to the UE, an indication that the UE is to SRS transmissions to the source cell or and release PUCCH resources associated with the source cell, as described above.

The process 600 may include additional aspects, such as any single aspect or any combination of aspects described below or in connection with one or more other processes described elsewhere herein.

In a first aspect, the indication is provided via at least one of: a MAC control element, a PDCCH, or RRC signaling.

In a second aspect, alone or in combination with the first aspect, the indication including information indicating that the source cell has ended the downlink communication transmission to the UE.

In a third aspect, alone or in combination with one or more of the first and second aspects, the indication is an explicit indication to cease the SRS transmissions to the source cell to release the PUCCH resources associated with the source cell.

In a fourth aspect, alone or in combination with one or more of the first through third aspects, the UE is to switch from a limited capability mode to a full capability mode based at least in part on the indication that the UE is to cease the SRS transmissions to the source cell, or to release the PUCCH resources associated with the source cell.

In a fifth aspect, alone or in combination with one or more of the first through fourth aspects, when the UE switches to the full capability mode, an indicator is provided to the target cell.

In a sixth aspect, alone or in combination with one or more of the first through fifth aspects, the UE is to cease monitoring and reception of downlink transmissions from the source cell based at least in part on the indication that the UE is to cease the SRS transmissions to the source cell, or to release the PUCCH resources associated with the source cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a UE. The example process 700 shows where a UE, such as the UE 120, performs operations associated with uplink switching for enhanced mobility.

As shown in FIG. 7, in some aspects, the process 700 may include receiving an indication that the UE is to cease SRS transmissions to a source cell or release PUCCH resources associated with the source cell (block 710). For example, the UE (such as by using receive processor 258, controller/processor 280, memory 282) may receive an indication that the UE is to cease SRS transmissions to a source cell or release PUCCH resources associated with a source cell, as described above. In some aspects, the indication is received after the source cell has ended a downlink transmission to the UE in association with a handover from the source cell to a target cell. In some aspects, the UE is connected to the source cell and the target cell during the handover.

As shown in FIG. 7, in some aspects, the process 700 may include ceasing, based at least in part on the indication, SRS transmissions to the source cell, or releasing PUCCH resources associated with the source cell (block 720). For example, the UE (such as by using receive processor 258, transmit processor 264, controller/processor 280, memory 282) may cease, based at least in part on the indication, SRS transmissions to the source cell, or release PUCCH resources associated with the source cell, as described above.

The process 700 may include additional aspects, such as any single aspect or any combination of aspects described below or in connection with one or more other processes described elsewhere herein.

In a first aspect, the indication is received via at least one of: a MAC control element, a PDCCH, or RRC signaling.

In a second aspect, alone or in combination with the first aspect, the indication includes information indicating that the source cell has ended the downlink transmission to the UE.

In a third aspect, alone or in combination with one or more of the first and second aspects, the indication is an explicit indication to cease the SRS transmissions to the source cell, or to release the PUCCH resources associated with the source cell.

In a fourth aspect, alone or in combination with one or more of the first through third aspects, the UE may switch from a limited capability mode to a full capability mode based at least in part on the indication that the UE is to cease the SRS transmissions to the source cell, or to release the PUCCH resources associated with the source cell.

In a fifth aspect, alone or in combination with one or more of the first through fourth aspects, when the UE switches to the full capability mode, an indicator is provided to the target cell.

In a sixth aspect, alone or in combination with one or more of the first through fifth aspects, the UE may cease monitoring and reception of downlink transmissions from the source cell based at least in part on the indication that the UE is to cease the SRS transmissions to the source cell, or to release the PUCCH resources associated with the source cell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a first network entity, comprising:
   providing a trigger to switch from a second network entity to the first network entity for transmitting physical uplink shared channel (PUSCH) communications,
      wherein the trigger is provided in association with a handover from the second network entity to the first network entity, and
      wherein the trigger is associated with a radio resource control (RRC) reconfiguration complete message received when a user equipment (UE) is connected to the second network entity and to the first network entity during the handover; and
   receiving the PUSCH communications based at least in part on providing the trigger,
      wherein physical uplink control channel (PUCCH) resources associated with the second network entity are released or sounding reference signal (SRS) transmissions to the second network entity are ceased.

2. The method of claim 1, wherein the switch from the second network entity to the first network entity is associated with transmitting a response indicating that the RRC reconfiguration complete message was received.

3. The method of claim 2, wherein the response serves as the trigger.

4. The method of claim 1, wherein the RRC reconfiguration complete message is Msg3 in a four-step random access procedure.

5. The method of claim 2, wherein a transmission of the RRC reconfiguration complete message serves as the trigger.

6. The method of claim 1, wherein the switch from the second network entity to the first network entity is associated with transmitting a physical downlink control channel (PDCCH) addressed to a cell radio network temporary identifier (C-RNTI) associated with the UE.

7. The method of claim 1, wherein the PUSCH communications carry new data.

8. The method of claim 1, further comprising:
   providing information indicating that the UE has ended uplink communications to the second network entity.

9. A method of wireless communication performed by a first network entity, comprising:
   determining to end downlink transmissions to a user equipment (UE) in association with a handover from the first network entity to a second network entity; and providing, based on determining to end downlink transmissions to the UE, an indication to at least one of release physical uplink control channel (PUCCH) resources associated with the first network entity or cease sounding reference signal (SRS) transmissions to the first network entity,
  wherein the PUCCH resources are released or SRS transmissions are ceased based on the indication.

10. The method of claim 9, wherein the indication is provided via a physical downlink control channel (PDCCH).

11. The method of claim 9, wherein the indication is provided via a medium access control (MAC) control element.

12. The method of claim 9, wherein the indication is provided via radio resource control (RRC) signaling.

13. The method of claim 9, wherein the UE is connected to the first network entity and the second network entity during the handover.

14. The method of claim 9, wherein determining to end downlink transmissions to the UE comprises:
  determining that the first network entity does not have any data for the UE.

15. The method of claim 9, wherein determining to end downlink transmissions to the UE comprises:
  detecting one or more channel conditions that cause the first network entity to cease transmitting downlink transmissions to the UE.

16. The method of claim 9, wherein the UE is switched to a full capability mode based at least in part on the indication.

17. An apparatus of a first network entity for wireless communication, comprising:
  one or more memories; and
  one or more processors, coupled to the one or memories, configured to:
    provide a trigger to switch from a second network entity to the first network entity for transmitting physical uplink shared channel (PUSCH) communications,
      wherein the trigger is provided in association with a handover from the second network entity to the first network entity, and
      wherein the trigger is associated with a radio resource control (RRC) reconfiguration complete message received when a user equipment (UE) is connected to the second network entity and to the first network entity during the handover; and
    receive the PUSCH communications based at least in part on providing the trigger,
      wherein physical uplink control channel (PUCCH) resources associated with the second network entity are released or sounding reference signal (SRS) transmissions to the second network entity are ceased.

18. The apparatus of claim 17, wherein the switch from the second network entity to the first network entity is associated with transmitting a response indicating that the RRC reconfiguration complete message was received.

19. The apparatus of claim 18, wherein the response serves as the trigger.

20. The apparatus of claim 17, wherein the RRC reconfiguration complete message is Msg3 in a four-step random access procedure.

21. The apparatus of claim 18, wherein a transmission of the RRC reconfiguration complete message serves as the trigger.

22. The apparatus of claim 17, wherein the switch from the second network entity to the first network entity is associated with transmitting a physical downlink control channel (PDCCH) addressed to a cell radio network temporary identifier (C-RNTI) associated with the UE.

23. The apparatus of claim 17, wherein the PUSCH communications carry new data.

24. The apparatus of claim 17, wherein the one or more processors are further configured to:
  provide information indicating that the UE has ended uplink communications to the second network entity.

25. An apparatus of a first network entity for wireless communication, comprising:
  one or more memories; and
  one or more processors, coupled to the one or more memories, configured to:
    determine to end downlink transmissions to a user equipment (UE) in association with a handover from the first network entity to a second network entity; and
    provide, based on determining to end downlink transmissions to the UE, an indication to at least one of release physical uplink control channel (PUCCH) resources associated with the first network entity or cease sounding reference signal (SRS) transmissions to the first network entity,
      wherein the PUCCH resources are released or SRS transmissions are ceased based on the indication.

26. The apparatus of claim 25, wherein the indication is provided via a physical downlink control channel (PDCCH).

27. The apparatus of claim 25, wherein the indication is provided via a medium access control (MAC) control element.

28. The apparatus of claim 25, wherein the indication is provided via radio resource control (RRC) signaling.

29. The apparatus of claim 25, wherein the one or more processors, to determine to end downlink transmissions to the UE, are configured to:
  determine that the first network entity does not have any data for the UE.

30. The apparatus of claim 25, wherein the one or more processors, to determine to end downlink transmissions to the UE, are configured to:
  detect one or more channel conditions that cause the first network entity to cease transmitting downlink transmissions to the UE.

31. A method of wireless communication performed by a first network entity, comprising:
  receiving a radio resource control (RRC) reconfiguration complete message when a user equipment (UE) is connected to a second network entity and to the first network entity during a handover from the second network entity to the first network entity;
  providing a response to the RRC reconfiguration complete message,
    wherein the response is a trigger to switch from the second network entity to the first network entity for transmitting physical uplink shared channel (PUSCH) communications, and
  receiving the PUSCH communications based at least in part on providing the trigger,
    wherein physical uplink control channel (PUCCH) resources associated with the second network entity are released or sounding reference signal (SRS) transmissions to the second network entity are ceased.

32. An apparatus of a first network entity for wireless communication, comprising:
  one or more memories; and one or more processors, coupled to the one or memories, configured to:
- receive a radio resource control (RRC) reconfiguration complete message when a user equipment (UE) is connected to a second network entity and to the first network entity during a handover from the second network entity to the first network entity;
- provide a response to the RRCE reconfiguration complete message,
  - wherein the response is a trigger to switch from the second network entity to the first network entity for transmitting physical uplink shared channel (PUSCH) communications, and
- receive the PUSCH communications based at least in part on providing the trigger,
  - wherein physical uplink control channel (PUCCH) resources associated with the second network entity are released or sounding reference signal (SRS) transmissions to the second network entity are ceased.

* * * * *